United States Patent
Ognibene

(10) Patent No.: US 9,032,999 B2
(45) Date of Patent: May 19, 2015

(54) DISTRIBUTOR DEVICE FOR HYDRAULIC POWER STEERING

(71) Applicant: OGNIBENE POWER S.P.A., Frazione Mancasale (Reggio Emilia) (IT)

(72) Inventor: Claudio Ognibene, Reggio Emilia (IT)

(73) Assignee: OGNIBENE POWER S.P.A., Frazione Mancasale (Reggio Emilia) (IT)

( * ) Notice: Subject to any disclaimer, the term of this patent is extended or adjusted under 35 U.S.C. 154(b) by 110 days.

(21) Appl. No.: 13/779,258

(22) Filed: Feb. 27, 2013

(65) Prior Publication Data
US 2013/0220458 A1    Aug. 29, 2013

(30) Foreign Application Priority Data
Feb. 28, 2012   (IT) .............................. RE2012A0014

(51) Int. Cl.
*B62D 5/083*   (2006.01)
*F16K 11/02*   (2006.01)

(52) U.S. Cl.
CPC .............. *F16K 11/02* (2013.01); *B62D 5/0837* (2013.01)

(58) Field of Classification Search
USPC .......... 137/625.23, 625.22, 625.24; 91/375 R
See application file for complete search history.

(56) References Cited

U.S. PATENT DOCUMENTS

| RE25,126 | E | * | 2/1962 | Charlson | .......................... 91/467 |
| 3,587,646 | A | | 6/1971 | Adams | |
| 3,819,307 | A | * | 6/1974 | Uppal | ........................... 418/61.3 |
| 4,311,171 | A | * | 1/1982 | Roberts | ..................... 137/625.23 |
| 4,471,808 | A | * | 9/1984 | Thomsen et al. | ......... 137/625.32 |
| 4,471,809 | A | * | 9/1984 | Thomsen et al. | ......... 137/625.32 |
| 4,804,016 | A | * | 2/1989 | Novacek et al. | ......... 137/625.23 |
| 5,267,588 | A | * | 12/1993 | Bishop et al. | ............. 137/625.23 |
| 6,186,173 | B1 | * | 2/2001 | Hansen et al. | ............ 137/625.23 |

FOREIGN PATENT DOCUMENTS

| EP | 0187591 A1 | 7/1986 |
| EP | 1009649 B1 | 12/2002 |

\* cited by examiner

*Primary Examiner* — John K Fristoe, Jr.
*Assistant Examiner* — Umashankar Venkatesan
(74) *Attorney, Agent, or Firm* — Volpe and Koenig, P.C.

(57) ABSTRACT

A rotary distributor device for a hydraulic power steering, which receives oil from a pump and sends the oil selectively to a discharge or to an actuator of the steering in a desired direction, comprises a jacket, a slide, sealedly rotating in the jacket, a series of openings that cross the wall of the jacket, located in front of a series of corresponding openings which cross the wall of the slide, elastic member located between the jacket and the slide configured to maintain the openings of the jacket at the openings of the slide, in which each opening in the jacket includes, in succession starting from the outside, at least one radial hole, a slot lying in a radial plane, arranged symmetrically with respect to the axis of the hole, the width being smaller than the diameter of the hole, and the depth being such as to intersect the hole.

6 Claims, 6 Drawing Sheets

DISTRIBUTOR DEVICE FOR HYDRAULIC POWER STEERING

FIELD OF INVENTION

The present invention relates to a jacket distributor destined to be used in hydraulic power steering devices.

BACKGROUND

Hydraulic steering devices comprise a hydraulic actuator destined for functioning in two opposite directions, generally constituted by a piston cylinder group with a through-stem, which is connected to the steering linkage.

The oil is sent to the hydraulic actuator by a distributor device which rotates internally of a fixed body to which the oil supply pump leads.

The rotary distributor sends controlled quantities of pressurised hydraulic fluid under pressure to the actuator to which it is connected, and sends the fluid coming from the actuator in discharge.

The present invention relates specifically to jacket-type rotary distributors, which comprise, internally of the fixed body, two sealedly coupled concentric cylindrical elements which are destined to take on various angular positions in relation to one another.

SUMMARY

The internal element, commonly called the slide, is axially hollow and is rigidly coupled to the vehicle steering wheel, while the external element, commonly called the jacket, is torsionally connected to the internal element via elastic means, limitedly to first small reciprocal rotations, and via rigid means beyond the small rotations.

In particular, the distributor can assume substantially three operating positions, in one of which, called the neutral position, the pressurized fluid from the associated pump is sent directly to discharge, and therefore the steering is not affected, while in each of the other two positions the pressurized fluid is sent to the hydraulic actuator which commands the steering in one direction or in the opposite direction, and the fluid originating from the hydraulic actuator is sent to discharge.

Both the slide and the jacket are provided with openings distributed on their surface, which are placed in mutual correspondence (neutral position) or are offset as a function of the relative angular position between the slide and jacket.

The elastic means maintain the jacket and the slide in the relative position corresponding to the neutral position, while the actuation of the steering wheel changes the mutual relative position of the slide and jacket such as to direct the hydraulic fluid in either direction corresponding to the two different steering directions.

The actuation of the steering wheel causes an out-of-phase displacement between the slide and jacket, which remains constant as long as the steering wheel continues to be turned, while when the steering wheel stops, the spring means return the jacket and the slide into phase and into the neutral position.

The jacket rotates internally of the fixed body of the distributor, in a cylindrical cavity of the outer body which comprises circumferential grooves for supplying the oil to the openings of the jacket.

In a distributor jacket of the above type, the radial openings distributed on the surface of the slide and of the jacket are very important, as is the circumferential extension of the internal openings of the jacket.

The invention specifically involves the openings through which the oil passes through the jacket and the slide and is sent to the discharge, through the openings in the jacket which are located correspondingly to the openings afforded in the slide.

A jacket distributor device is known in which the openings of the jacket are constituted by radial holes interesting the face of the casing, which radial holes comprise a first part which penetrates only partially into the outer wall of the jacket, followed by a portion having a smaller section which leads up to the internal surface of the jacket.

Alternatively the reduced-section part can be replaced by a slot located on a diametral plane of the jacket, and having a width (circumferential extension) that is smaller than the diameter of the first section of the holes present in the jacket wall.

The slot realizes the reduced section of the hole, improving the shape of the interface between the opening and the slide This distributor is described in European patent EP 1009649 B1.

Thanks to this conformation several problems are solved relating to the limitation of the deformations of the components of the jacket distributor as a result of excess pressure inside the jacket. These deformations may compromise free rotation of the jacket in the body, and/or of the slide in the jacket.

To ensure good operation, the width of the slot must be, as mentioned, as small as possible in order to ensure a large oil-sealed circumferential space between adjacent slots.

Though obviating the specified problems, this solution exhibits drawbacks which significantly limit use thereof.

The reduction of the oil passage section that is established from the first portion to the second portion of the hole, or from the first section of the hole to the slot, alters the hydraulic state of the oil.

Furthermore, this reduction creates a choke effect that modifies the operating state of the oil.

These phenomena can result in operational instability of the device, or also in an increase in the energy needed for operation thereof, or unwanted noise.

The aim of the present invention is to reduce the above-described phenomena with a simple and economical solution.

This result is achieved, according to the invention, by a distributor device having the characteristics recited in the independent claim.

The dependent claims relate to further advantageous characteristics of the invention.

BRIEF DESCRIPTION OF THE DRAWINGS

The advantages and constructional and functional characteristics of the invention will emerge from the detailed description that follows, with reference to the figures of the accompanying drawings, which illustrate a particular preferred embodiment thereof, given by way of non-limiting example.

DETAILED DESCRIPTION OF THE PREFERRED EMBODIMENTS

Figure 1:
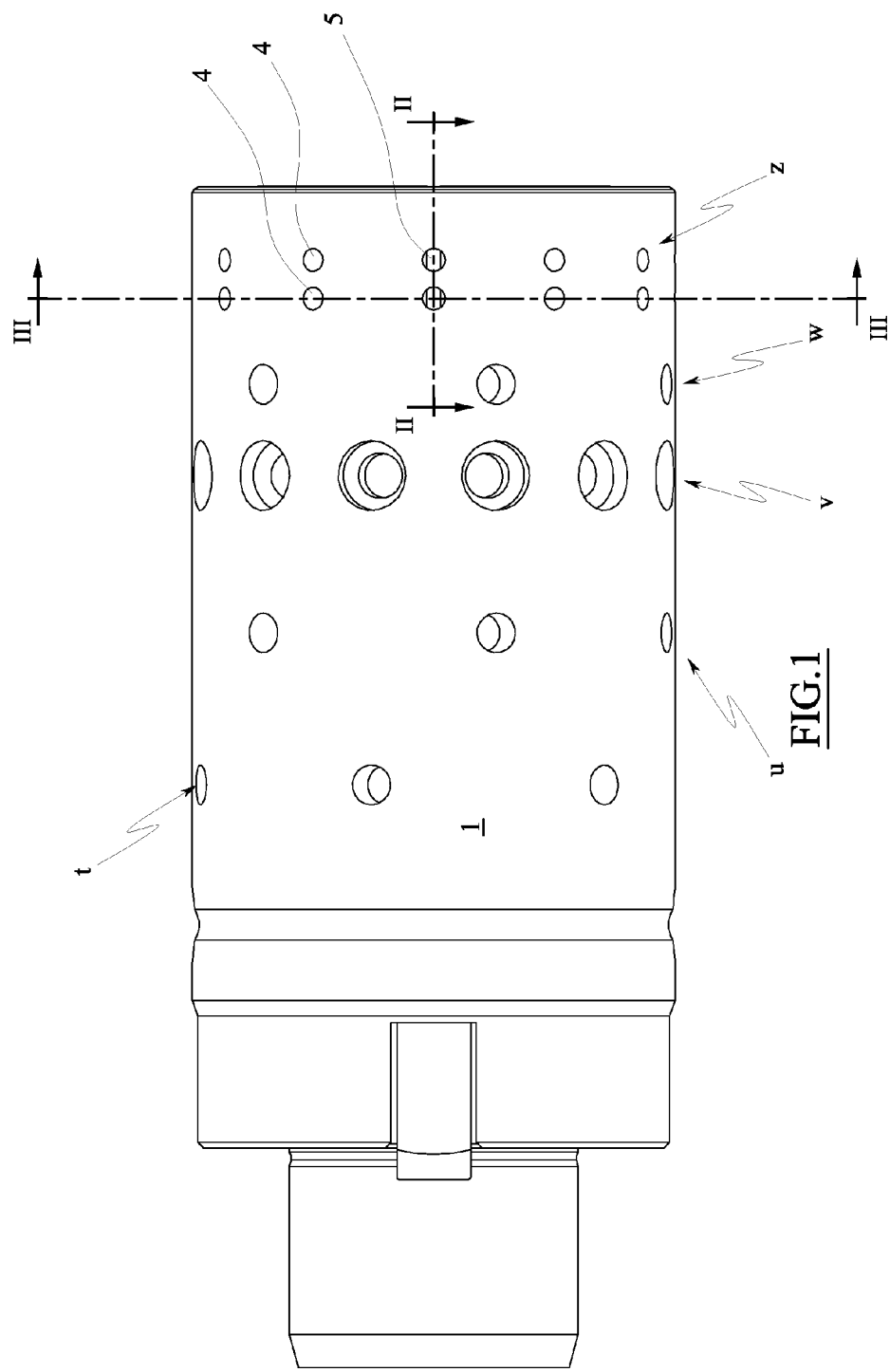
FIG. 1 shows a side view of the jacket of the distributor, according to a first embodiment of the invention.
Figures 2, 5:
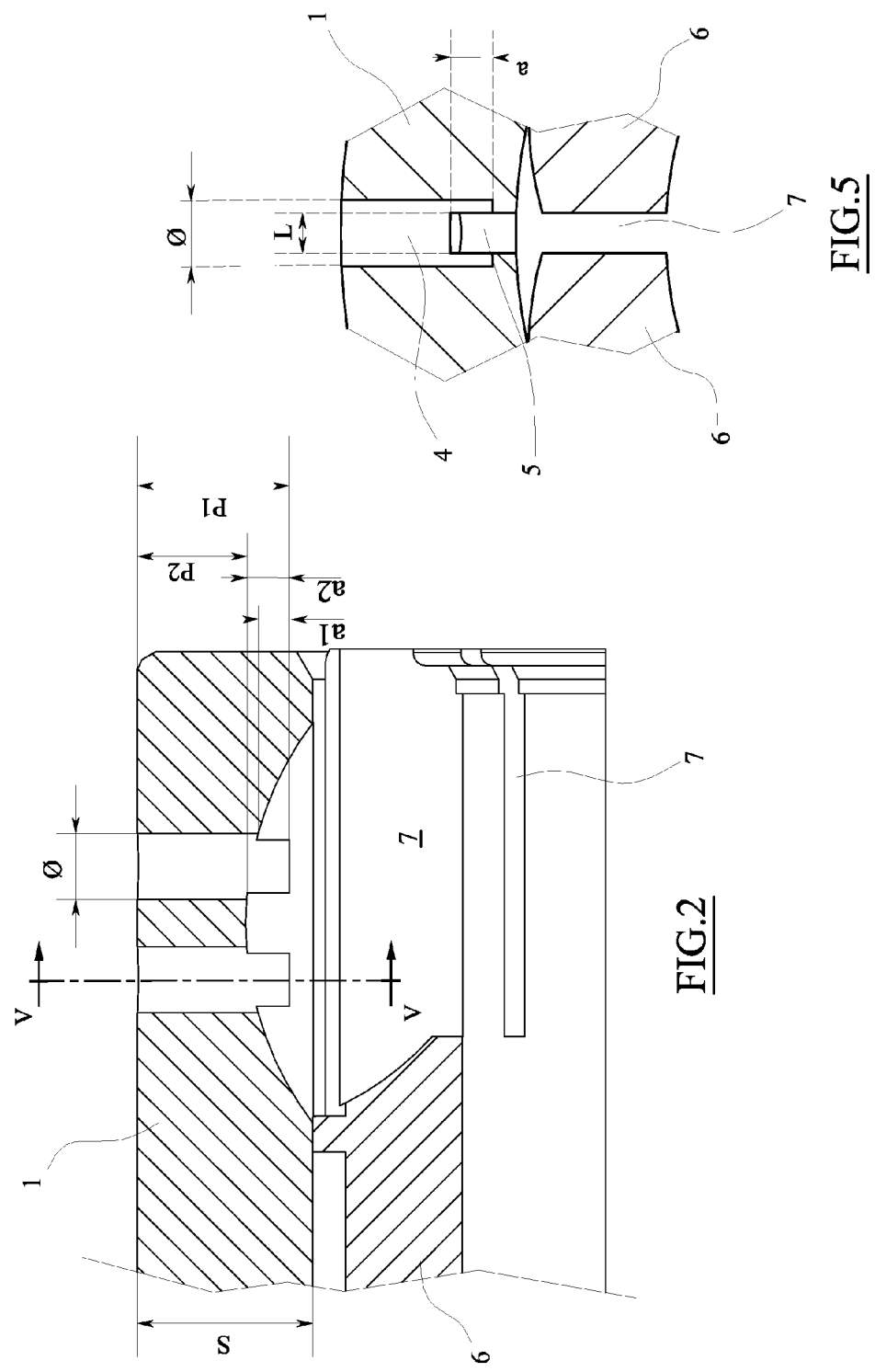
FIG. 2 is section II of FIG. 1.
FIG. 5 is the section V-V of FIG. 2.
Figure 4:
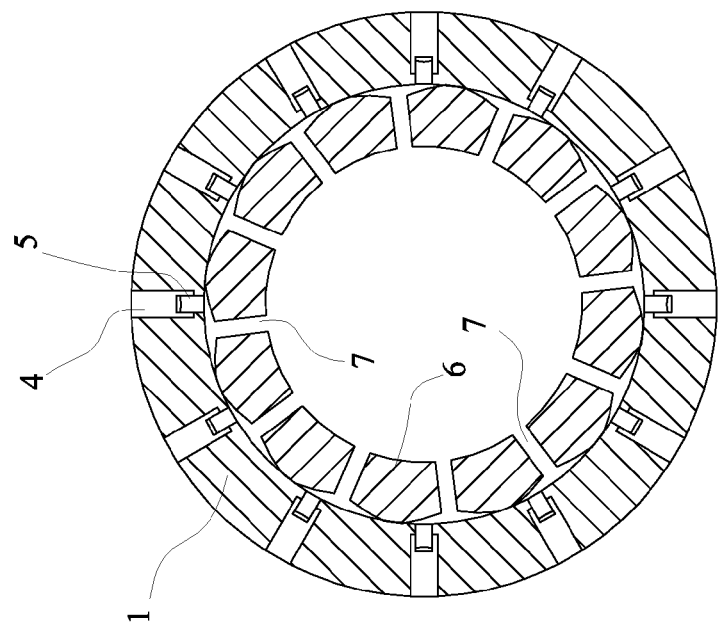
FIG. 4 shows the device of FIG. 3 in a different operating position.
Figure 3:
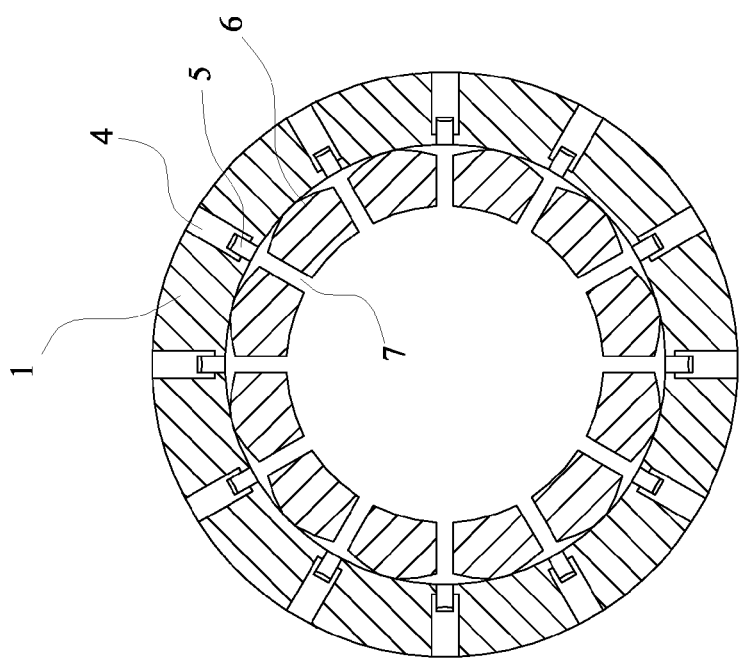
FIG. 3 is section III-III of FIG. 1, with the slide inside the jacket.

The figures form FIG. 1 to FIG. 5 illustrate the jacket (1), which is equipped with four circumferential series (t), (u) (v), (w) and (z) of openings.

The invention relates specifically to the openings of the series denoted by (z).

In the illustrated example the openings each comprise a pair of radial holes (4) which branch from the external surface of the jacket, without reaching the inner surface. However, as mentioned, the holes may be one or more than one for each opening, and for example they may be three for each opening.

The axes of the holes of each pair of holes of the example are located on the same diametral plane as the jacket.

They result in an axially developing slot (5) the central plane of symmetry of which includes the axis of the holes (4).

The slot (5) can be conveniently bored using a milling tool, and is sometimes referred to as a milling.

Alternatively, the openings may comprise one hole (4) only.

The width (L) of the slot (5) is advantageously smaller than the diameter (ø) of the holes (4), and is preferably between 0.30ø and 0.85ø, while the axial extension thereof on the internal surface of the jacket is preferably comprised between two and five times the sum of the diameters of the holes.

This not only enables the arc between two adjacent slots (5) to be made much smaller than the arc between two adjacent holes, but also avoids having to reduce the passage section of the oil in the openings comprising the holes (4).

The section reduction found in the prior art in the passage between the holes and the slot into which they open is obviated due to the fact that, as mentioned, the holes extend internally of the slot.

The slide (6), of usual construction, is located inside the jacket (1), which slide (6) is provided with openings (7) constituted by slots or grooves flared toward the outside of the slide, which are not described in greater detail in as they are of usual type.

With reference to the figures, note that in the present device the jacket (1) has a thickness (S) and openings each of which openings comprises two holes (4) of a diameter (ø) that starting from the outer surface penetrate to a depth (P1) of less than the thickness of the jacket.

An axial slot (5) is present in the inner surface of the jacket at the centre of the holes, the slot (5) a having a width (L) that is smaller than the diameter (ø) of the holes, in the example L=0.8ø.

The slot (5) penetrates the internal wall of the jacket up to a distance (P2) from the outer wall of the jacket.

The slot (5) and the holes (4) superpose one another by a mean amount (a), which in the specific case of the two holes shown in the figure is a=($a_1$+$a_2$):2.

The inlet section of the oil into the jacket, going from the outside towards the inside, is $$S_{in}=2\cdot[\tfrac{1}{4}\cdot\Pi\cdot\varnothing^2]$$

the passage section of the oil from the holes of the jacket to the slot, going from the outside towards the inside, is $$S_{out}=2\cdot[(a1+a2+\varnothing)\cdot L]$$

The passage section of the oil from the jacket to the slide is certainly greater than $S_{out}$.

By suitably adjusting the diameter, depth and number of holes 5 in each opening, the width L of the slot 5, and the interference (a) between the slot and the holes, the section of the oil passage in the openings can constantly be maintained at least equal to the inlet section through the holes, thus avoiding any undesired choking.

Figure 6:
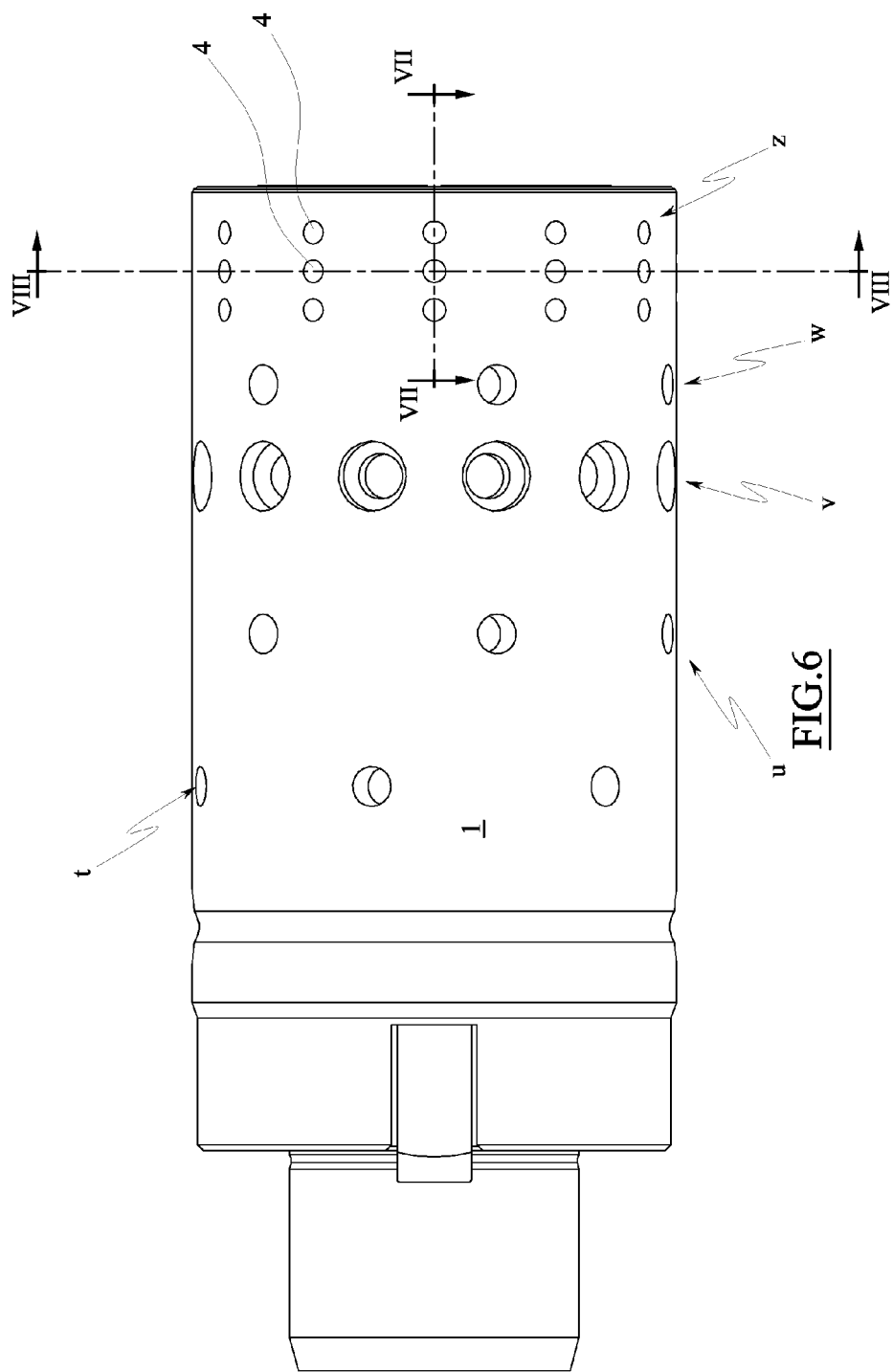
FIG. 6 shows a side view of the jacket of the distributor according to a second embodiment of the invention.
Figure 10:
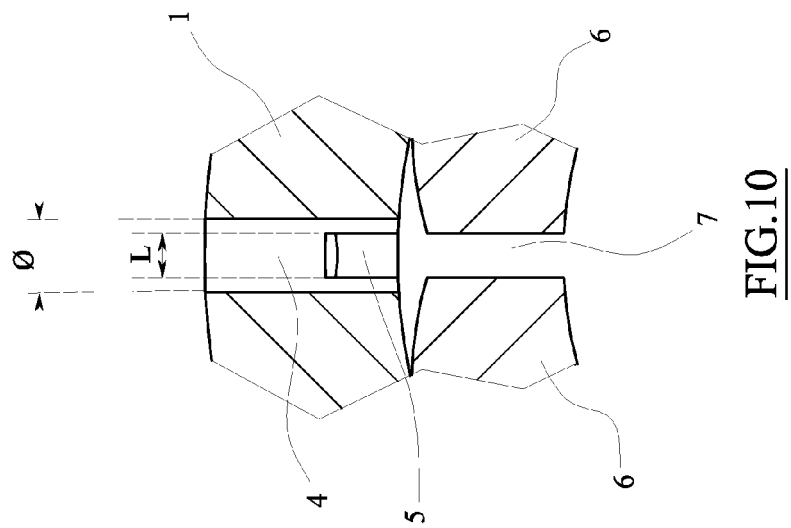
FIG. 10 is the section X-X of FIG. 7.
Figure 7:
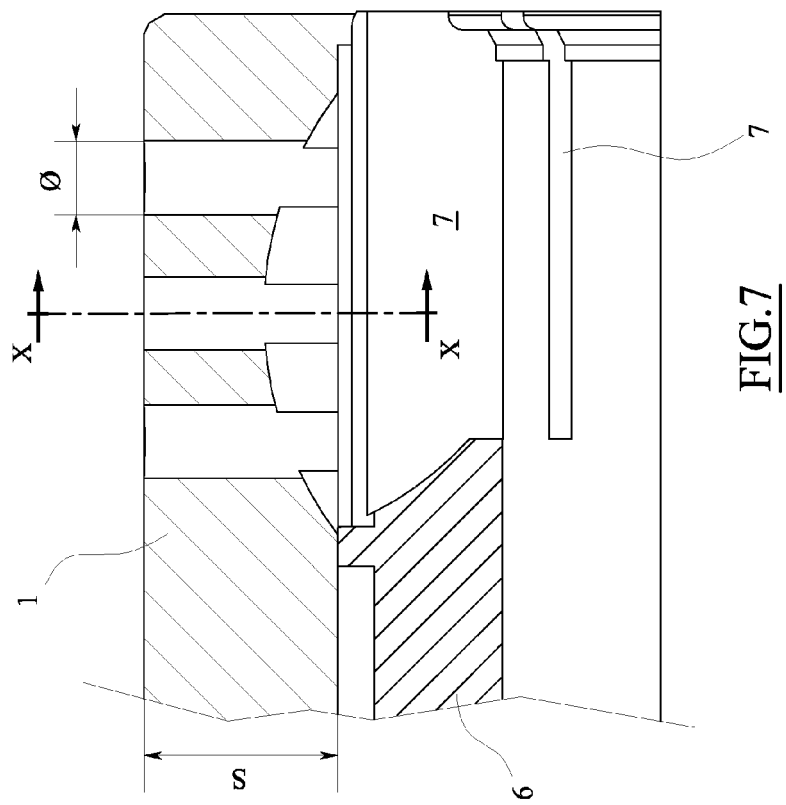
FIG. 7 is section VII-VII of FIG. 6.
Figure 9:
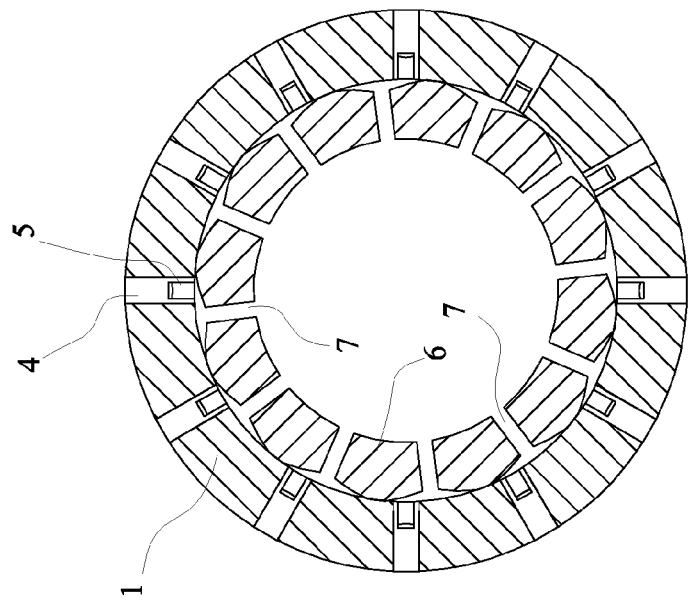
FIG. 9 shows the device of FIG. 8 in a different operating position.
Figure 8:
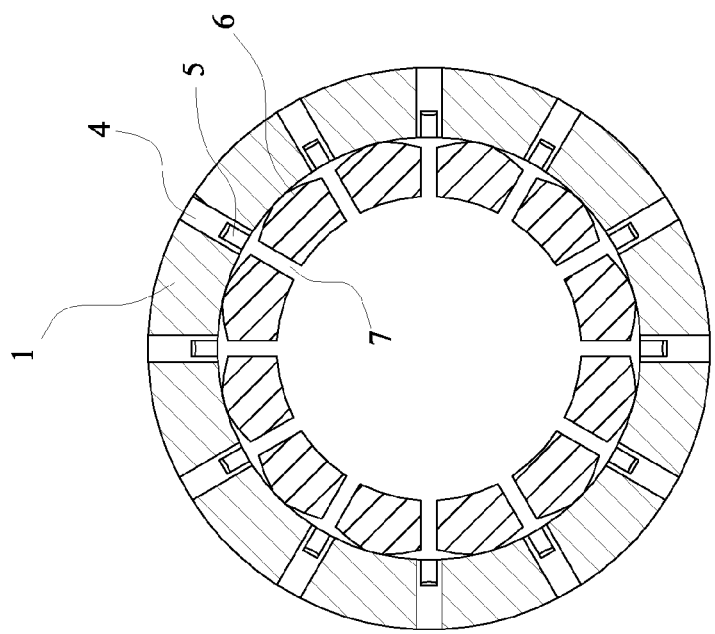
FIG. 8 is section VIII-VIII of FIG. 6, with the slide inside the jacket.

The figures from FIG. 5 to FIG. 10, which maintain the same numeral references of the figures from FIG. 1 to FIG. 5, illustrate the second embodiment of the invention which is different from the first embodiment because the radial holes 4 are three in number.

In the second embodiment each hole 4 extends through the whole width of the jacket, up to the internal wall of the jacket.

Also in the second embodiment the said holes can be more than one hole for each opening, for example the holes can be three in number for each opening.

Also in the second embodiment the hole axis gf the hole of the same opening of three hole are aligned on the same diametrical plane of the jacket.

The holes open on the internal wall of the jacket, and therefore the oil flow section in the opening comprising the holes (4) does not comprise any reduced oil flow section.

All the other details of the first embodiment are not modified in the second embodiment.

It is understood that the invention is not limited to the example described herein above, and that variations and improvements can be made thereto without its forsaking the ambit of the following claims.

What is claimed is:

1. A rotary distributor device for a hydraulic power steering, which receives oil from a pump and sends the oil selectively to a discharge or to an actuator of the steering in a desired direction, the distributor device comprising an external body, a jacket, rotating in the body of the distributor, a slide, sealedly rotating in the jacket, a series (z) of openings that cross a wall of the jacket, located in front of a series of corresponding openings (7) which cross a wall of the slide, each opening of the jacket comprises at least one radial hole which departs from an external surface of the jacket, and a slot lying in a radial plane, arranged symmetrically with respect to the axis of the at least one radial hole, a width (L) of the slot is smaller than the diameter ø of the at least one radial hole, and a depth of which is such that the slot penetrates the hole, and the slot and the holes superpose one another so that by suitably adjusting the diameter, depth and number of holes in each opening, the width L and the depth of the slot, the section of the oil passage in the openings can constantly be maintained at least equal to the inlet section through the holes, thus avoiding any undesired choking.

2. The device of claim 1, wherein the at least one radial hole (4) of each opening terminates at an internal surface of the jacket.

3. The device of claim 1, wherein the width of the slot is comprised between 0.30 and 0.85 times the diameter ø of the at least one radial hole.

4. The device of claim 1, wherein the surface length of the slot at the intersection of the inner diameter of the jacket is at least two times the diameter of the at least one hole.

5. The device of claim 1, wherein the surface length of the slot at the intersection of the inner diameter of the jacket is comprised between three and at least 5 times the sum of the diameters of the at least one holes.

6. The device of claim 1, wherein the at least one hole (4) of each opening are three in number.

\* \* \* \* \*